US012573981B2

(12) United States Patent
Kobayashi

(10) Patent No.: US 12,573,981 B2
(45) Date of Patent: Mar. 10, 2026

(54) TRESTLE BASE AND TRESTLE

(71) Applicants: Sunstack, LLC, Plainfield, NJ (US);
Roof and Solar Technologies Inc.,
Poway, CA (US)

(72) Inventor: Shuichi Kobayashi, Poway, CA (US)

(73) Assignees: Sunstack, LLC., Plainfield, NJ (US);
Roof and Solar Technologies Inc.,
Poway, CA (US)

( * ) Notice: Subject to any disclaimer, the term of this
patent is extended or adjusted under 35
U.S.C. 154(b) by 79 days.

(21) Appl. No.: 18/507,561

(22) Filed: Nov. 13, 2023

(65) Prior Publication Data

US 2024/0421756 A1 Dec. 19, 2024

(30) Foreign Application Priority Data

Jun. 19, 2023 (JP) ................................. 2023-099810

(51) Int. Cl.
*H02S 30/10* (2014.01)
*F16B 2/20* (2006.01)
*H02S 20/23* (2014.01)
(52) U.S. Cl.
CPC ................ *H02S 30/10* (2014.12); *F16B 2/20*
(2013.01); *H02S 20/23* (2014.12)
(58) Field of Classification Search
CPC ............. H02S 30/10; H02S 20/23; F16B 2/20
USPC ....... 248/237, 220.21–220.22, 505, 499–500
See application file for complete search history.

(56) References Cited

U.S. PATENT DOCUMENTS

| | | | | | |
|---|---|---|---|---|---|
| 670,763 | A | * | 3/1901 | Brodeur ................... | B41J 29/04 |
| | | | | | 248/680 |
| 8,740,173 | B2 | * | 6/2014 | Hagihara .............. | F16L 19/025 |
| | | | | | 248/500 |
| 8,925,893 | B2 | * | 1/2015 | Biedenweg ........... | B60P 7/0807 |
| | | | | | 248/500 |
| 11,848,638 | B1 | * | 12/2023 | Jasmin .................... | H02S 20/23 |
| 2013/0163207 | A1 | * | 6/2013 | Chen ................... | H01L 23/4006 |
| | | | | | 361/720 |
| 2019/0372507 | A1 | * | 12/2019 | Kobayashi ............ | F16B 5/0628 |

FOREIGN PATENT DOCUMENTS

JP 2006-057357 A 3/2006

* cited by examiner

*Primary Examiner* — Christopher Garft
(74) *Attorney, Agent, or Firm* — Ohlandt, Greeley and
Perle, L.L.P.

(57) ABSTRACT

Provided are a trestle base and a trestle whereby fixing
strength can be obtained with a small fixing member. The
trestle base is for fixing an installation object to be installed
on a roof surface of a building. A support member support-
ing the installation object is attached to a base main body,
and the base main body is fixed to the roof surface. A first
mounting bracket is attached to one end of the base main
body. A second mounting bracket is attached to another end
of the base main body. The first mounting bracket and the
second mounting bracket include, on both ends, a fixer that
is fixed to the roof surface.

10 Claims, 14 Drawing Sheets

TRESTLE BASE AND TRESTLE

CROSS-REFERENCE TO RELATED APPLICATIONS

This application claims the benefit of Japanese Patent Application No. 2023-099810, filed on Jun. 19, 2023, the entire disclosure of which is incorporated by reference herein.

FIELD OF THE INVENTION

The present disclosure relates generally to a trestle base, and a trestle.

BACKGROUND OF THE INVENTION

Unexamined Japanese Patent Application Publication No. 2006-057357 describes a mounting structure for a functional panel in which a crosspiece for supporting the functional panel is fixed, via a fixture, to a support piece provided on a support tile. In the invention described in Unexamined Japanese Patent Application Publication No. 2006-057357, the fixture is attached by a bolt to the support piece provided on the support tile and, also, the crosspiece is attached by a bis to the fixture.

In the invention described in Unexamined Japanese Patent Application Publication No. 2006-057357, the support piece is attached to the support tile and the crosspiece is fixed via the fixture. In order to obtain fixing strength, the size of the fixing member, such as the support piece, must be increased. When the size of the fixing member is increased, the transport efficiency of the fixing member decreases. As such, there is a demand for obtaining fixing strength with a small fixing member.

The present disclosure is made with the view of the above situation, and an objective of the present disclosure is to provide a trestle base and a trestle whereby fixing strength can be obtained with a small fixing member.

SUMMARY OF THE INVENTION

A trestle base according to the present disclosure that achieves the objective described above is:

a trestle base for fixing an installation object to be installed on a roof surface of a building, the trestle base including:

a base main body to which a support member supporting the installation object is attached, and that is fixed to the roof surface;

a first mounting bracket that is attached to one end of the base main body; and a second mounting bracket that is attached to another end of the base main body, wherein the first mounting bracket and the second mounting bracket each include, on both ends, a fixer that is fixed to the roof surface.

The base main body may include a bottom plate that is fixed to the roof surface, and a pair of side walls erected on the bottom plate.

The base main body may further include a wall erected on one end of the bottom plate, and the first mounting bracket may be provided between the pair of side walls and the wall, and disposed on an upper surface of the bottom plate.

The first mounting bracket may be fitted in a slit provided between the bottom plate and the pair of side walls.

The second mounting bracket may be fitted in a slit provided between the bottom plate and the pair of side walls.

A gap may be provided between the bottom plate, and the first mounting bracket and the second mounting bracket.

A gap may be provided between the base main body, and the fixer provided to the first mounting bracket and the second mounting bracket.

A trestle according to the present disclosure that achieves the objective described above includes:

the trestle base;

a support member attached to the trestle base; and a fixing unit that is supported by the support member and that is for fixing an installation object to be installed on a roof surface of a building.

According to the present disclosure, a trestle base and a trestle can be provided whereby fixing strength can be obtained with a small fixing member.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, embodiments of the present disclosure are described while referencing the drawings. Note that, to facilitate comprehension, XYZ coordinates that are orthogonal to each other are set and appropriately referenced. An XY plane of the XYZ coordinates is a plane parallel to a roof surface R on which a trestle 1 is to be installed. A Z-axis direction is a direction parallel to a height direction H from the roof surface R. In the present embodiment, an eave-ridge direction, which is a direction from the ridges to the eaves of a building, is the same direction as an X-axis direction.

Figure 1:
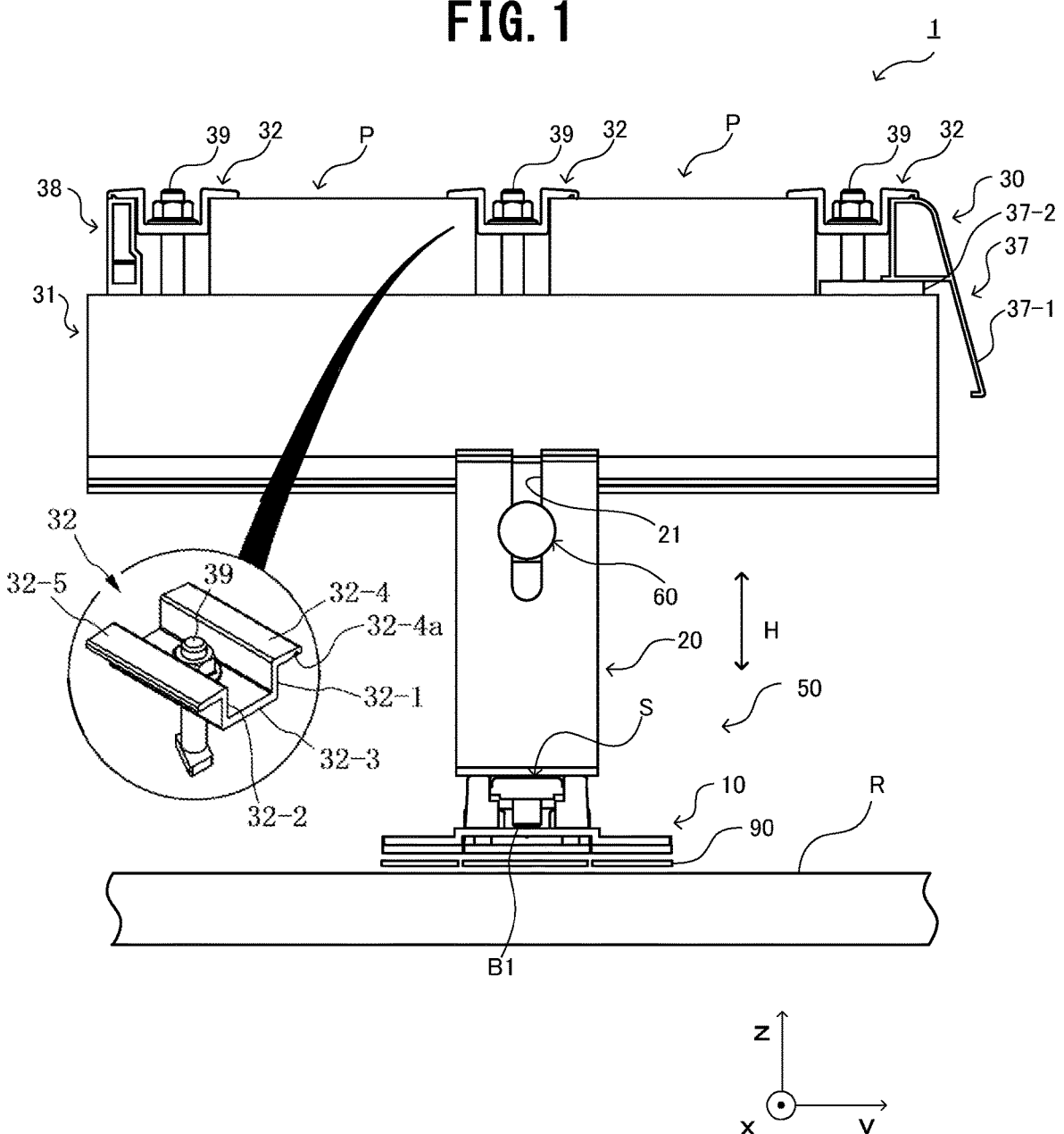
FIG. 1 is a back view of a trestle according to an embodiment.
Figure 2:
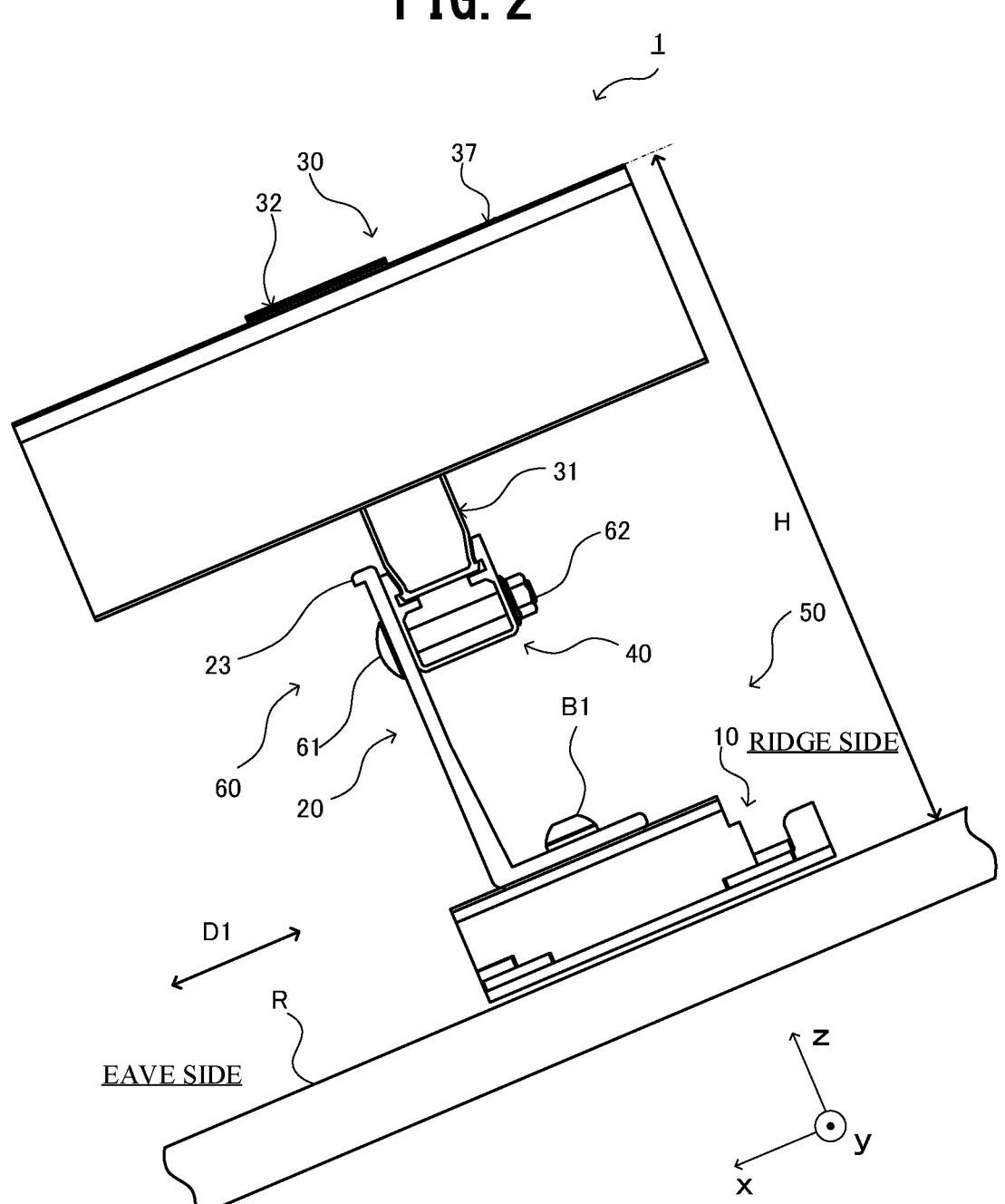
FIG. 2 is a side view of the trestle according to the embodiment.

As illustrated in FIGS. 1 and 2, the trestle 1 is, for example, mounted on a roof surface R of a building and is used to support a solar panel P, as an installation object, to be installed on the roof surface R. Note that, in the present embodiment, the building on which the trestle 1 is mounted is a house that includes ridges and eaves of the roof. The trestle 1 according to the present embodiment includes a fixing unit 30, a receiving member 40, a base unit 50, and a first fastener 60.

The fixing unit 30 is fixed to the receiving member 40 by the first fastener 60, and fixes the solar panel P. The fixing unit 30 includes an installation object disposing member 31, a fixing member 32, a cover 37, a fixing member receiving member 38, and a second fastener 39. In one example, the various components of the fixing unit 30 are formed from a metal. However, the present disclosure is not limited thereto. The various components of the fixing unit 30 may be formed from a material other than metal. For example, the various components of the fixing unit 30 may be formed from materials that have high rigidity, such as resins, ceramics, or the like. A portion of the various components of the fixing unit 30 may be formed from a different material. However, it is preferable that the various components of the fixing unit 30 are formed from a metal, and it is more preferable that all of the various components of the fixing unit 30 are formed from the same metal material.

In the present embodiment, the installation object disposing member 31 is a horizontal beam that extends in a Y-axis direction. The installation object disposing member 31 is formed such that an XZ cross-section thereof has a rectangular prismatic shape in which the Z-axis direction is the longitudinal direction. In one example, the installation object disposing member 31 is formed by extruding a metal. Specifically, the installation object disposing member 31 is formed by extruding aluminum, for example. A fixing member attachment groove is formed, on an upper surface on the +Z side of the installation object disposing member 31, along the Y-axis direction that is orthogonal to the eave-ridge direction, which is the direction from the ridges to the eaves of the building. Note that, in the present embodiment, the installation object disposing member 31 is a horizontal beam that extends in a direction orthogonal to the eave-ridge direction. However, the present disclosure is not limited thereto. The installation object disposing member 31 may be a beam other than a horizontal beam. For example, the installation object disposing member 31 may be a vertical beam that extends in the same direction as the eave-ridge direction. Additionally, the installation object disposing member 31 may be a beam, other than a horizontal beam or a vertical beam, that extends in a direction crossing the eave-ridge direction.

The upper surface on the +Z side of the installation object disposing member 31 is a surface on which the solar panel P is disposed. The upper surface on the +Z side is formed as a surface parallel to the YZ plane so as to facilitate disposal of the solar panel P.

The fixing member 32 is a member that sandwiches the solar panel P disposed on the upper surface of the installation object disposing member 31 and that is fixed to the installation object disposing member 31. In the present embodiment, three of the fixing members 32 are provided, and the three fixing members 32 fix two of the solar panels P. Each of the fixing members 32 includes side walls 32-1, 32-2, a coupling plate 32-3, and extensions 32-4, 32-5.

Each of the side walls 32-1, 32-2 is formed in a plate shape parallel to the YZ plane.

The coupling plate 32-3 is formed in a plate shape parallel to the XY plane. The coupling plate 32-3 couples the side walls 32-1, 32-2. A hole into which the second fastener 39 is inserted is formed on the coupling plate 32-3.

The extension 32-4 extends from an upper end (+Z side end) of the side wall 32-1. The extension 32-4 holds down any of the solar panel P, the cover 37, and the fixing member receiving member 38 against the installation object disposing member 31. An engaged portion 32-4*a* is formed on a lower surface on the −Z side of the extension 32-4

The extension 32-5 extends from an upper end (+Z side end) of the side wall 32-2 in a direction opposite the extending direction of the extension 32-4. The extension 32-5 holds down any of the solar panel P, the cover 37, and the fixing member receiving member 38 against the installation object disposing member 31. Different from the extension 32-4, an engaged portion is not formed on the lower surface on the −Z side of the extension 32-5.

The cover 37 covers the +Y side end of the installation object disposing member 31. The cover 37 is constituted from an electrically conductive material. In one example, the cover 37 is formed by extruding a metal. Specifically, in one example, the cover 37 is formed by extruding aluminum and, then, subjecting the surface thereof to black color alumite treatment. As a result, the silver color, which is the color of the aluminum itself, is covered. This cover 37 includes a cover main body 37-1 and a spacer 37-2.

The second fastener 39 sandwiches the solar panel P by the installation object disposing member 31 and the fixing member 32, and fastens the installation object disposing member 31 and the fixing member 32.

The receiving member 40 receives the fixing unit 30 from below. In one example, the receiving member 40 is formed by extruding a metal. Specifically, the receiving member 40 is formed by extruding aluminum, for example.

The support member 20 is an L-shaped angle bracket in which the XZ cross-section is formed in an L shape, and supports the receiving member 40 near an upper end of the L shape. The support member 20 is fixed to a slide bracket S of the base unit 50. A height direction adjusting groove 21 (receiving member attacher) and a protrusion 23 are provided on the support member 20.

The height direction adjusting groove 21 (the receiving member attacher), is a groove that extends long in the height direction H. The first fastener 60 is inserted into the height direction adjusting groove 21. The height direction adjusting groove 21 is used to adjust a position in the height direction H of the receiving member 40.

The protrusion 23 protrudes in the +X direction from the upper end (the +Z side end) of the support member 20. A bolt head of the first fastener 60 hooks on the protrusion 23 and, thus, the protrusion 23 prevents the first fastener 60 from separating upward (the +Z direction) from the height direction adjusting groove 21. Note that, in the present embodiment, the protrusion 23 protrudes in the +X direction from the upper end (the +Z side end) of the support member 20. However, the present disclosure is not limited thereto. The protrusion 23 may protrude in the −X direction, opposite the +X direction, from the upper end (the +Z side end) of the support member 20. However, when the protrusion 23 protrudes in the −X direction, the protrusion 23 may interfere with the receiving member 40 attached to the support member 20. As such, it is preferable that the protrusion 23 protrudes in the +X direction from the upper end (the +Z side end) of the support member 20.

In one example, a support member mounting fastener B1 is constituted from a bolt or a screw. The support member mounting fastener B1 is screwed into a screw hole of the slide bracket S. The support member mounting fastener B1 is used to mount the support member 20 on the slide bracket S.

The first fastener 60 includes a bolt 61 and a nut 62. In one example, the bolt 61 is constituted from a bolt or a screw. In the present embodiment, the bolt 61 of the first fastener 60 is screwed into the nut 62. However, the present disclosure is not limited thereto. For example, the hole of the receiving member 40 may be configured as a screw hole, and the bolt 61 may be screwed into this screw hole. In such a case, the nut 62 can be omitted, and the first fastener 60 is configured from only the bolt 61.

The base unit 50 fixes the receiving member 40 so as to be adjustable in the height direction H from the roof surface R, and supports the fixing unit 30 via the receiving member 40. The base unit 50 includes a trestle base 10, the slide bracket S (slide member), the support member 20, and the support member mounting fastener B1.

Figure 3:
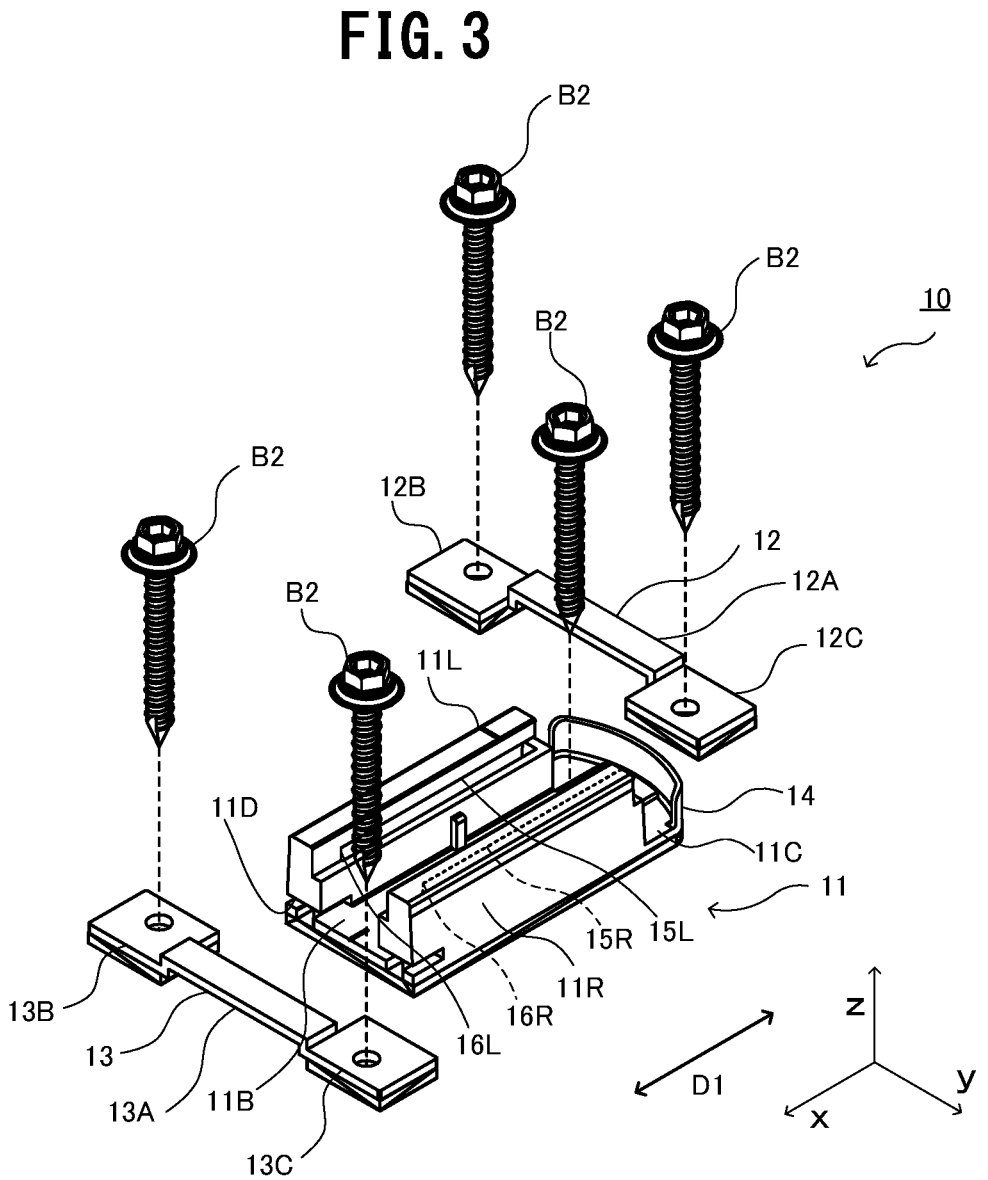
FIG. 3 is an exploded perspective view of a trestle base according to the embodiment.

In one example, the trestle base 10 is formed from a metal and, specifically, is formed by die casting using a die, for example. As illustrated in FIG. 3, the trestle base 10 includes a base main body 11, a first mounting bracket 12, and a second mounting bracket 13.

The base main body 11 includes a bottom plate 11B that is fixed to the roof surface R illustrated in FIG. 1, a pair of side walls 11R, 11L erected on the bottom plate 11B, and a wall 14 formed on one end of the bottom plate 11B.

A pair of grooves 15R, 15L, in which a portion of the slide bracket S fits, is formed on respective opposing surfaces of the pair of side walls 11R, 11L. The slide bracket S is used to fix the support member 20 illustrated in FIG. 1.

The grooves 15R, 15L are formed so as to extend along a first direction D1 (the eave-ridge direction). Slide restrictors 16R, 16L are formed in the grooves 15R, 15L. Note that, in the present embodiment, the slide restrictors 16R, 16L are respectively formed in the grooves 15R, 15L and, thus, two are formed. However, the present disclosure is not limited thereto. The slide restrictors 16R, 16L may be formed in one of the grooves 15R, 15L.

The slide restrictors 16R, 16L are formed to restrict sliding, with respect to the trestle base 10 illustrated in FIG. 1, of the slide bracket S in the first direction D1. In the present embodiment, the slide restrictors 16R, 16L restrict sliding, with respect to the trestle base 10 illustrated in FIG. 1, of the slide bracket S in the +X direction.

Figure 4:
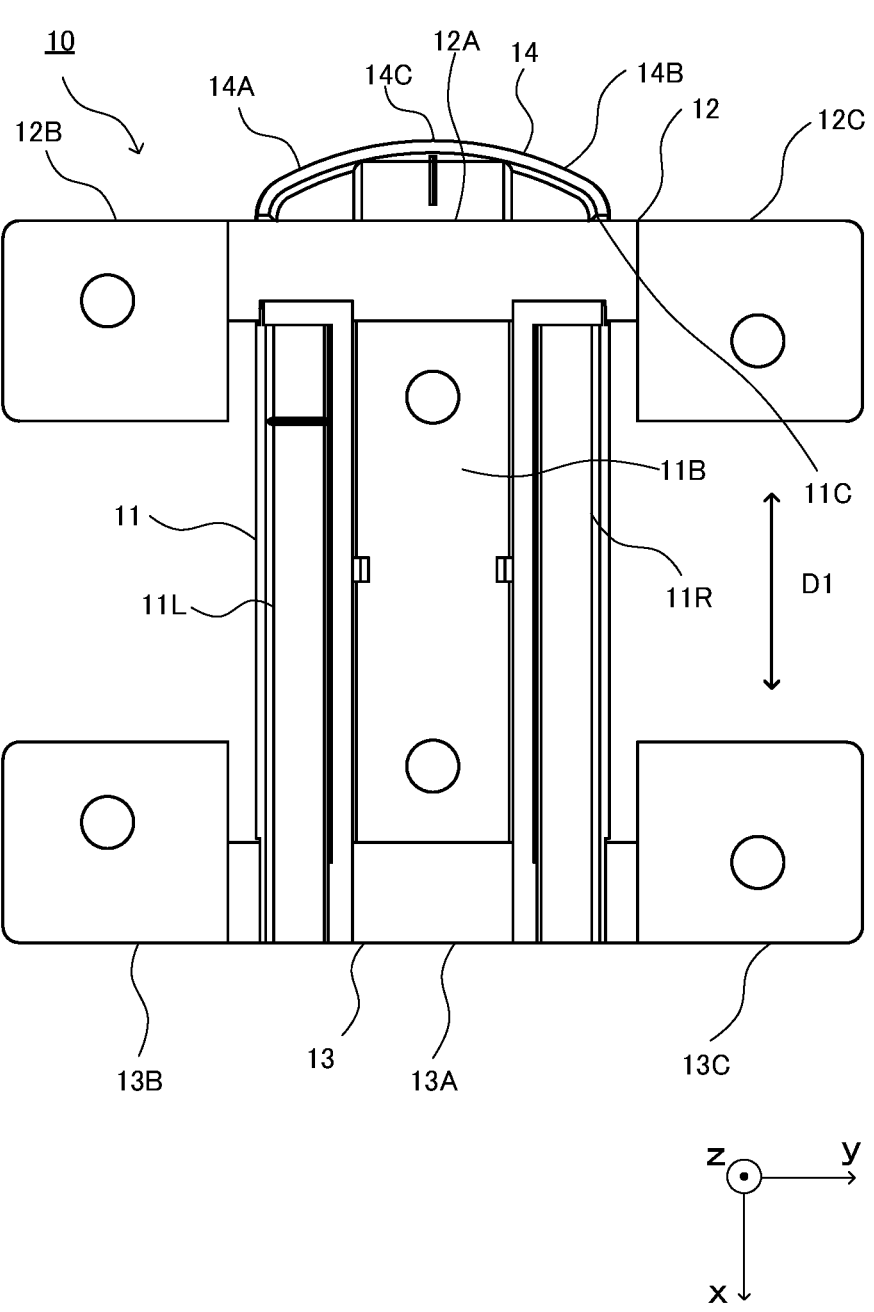
FIG. 4 is a first top view of the trestle base according to the embodiment.

The wall 14 is provided, with a gap between the wall 14 and the pair of side walls 11R, 11L, at the end toward the ridge (toward the −X side) on the base main body 11, and is formed protruding upward (in the +Z direction) with respect to the XY plane. The wall 14 is formed integrally with the base main body 11 by casting. In one example, the wall 14 is used to direct rainwater, flowing from the ridge side, to the left and right. As illustrated in FIG. 4, the wall 14 includes a first inclined surface 14A, a second inclined surface 14B, and a protruding surface 14C. The first inclined surface 14A is formed inclined with respect to the first direction D1. The second inclined surface 14B is a separate inclined surface from the first inclined surface 14A. The second inclined surface 14B is formed inclined with respect to the first direction D1. The protruding surface 14C is provided between the first inclined surface 14A and the second inclined surface 14B. The protruding surface 14C is formed protruding in the ridge direction (the −X direction). In the present embodiment, the protruding surface 14C is formed as a curved surface.

The first mounting bracket 12 fixes the base main body 11 to the roof surface R illustrated in FIG. 1, and includes a hold down member 12A that holds down the bottom plate 11B, and fixers 12B, 12C that are formed on both ends and that are fixed to the roof surface R. The hold down member 12A is provided on the wall 14, the pair of side walls 11R, 11L, and a gap 11C, and is disposed on an upper surface of the bottom plate 11B. The fixers 12B, 12C include a step, having a thickness of the base main body 11, with respect to the hold down member 12A. A screw hole in which a base mounting fastener B2 illustrated in FIG. 3 is inserted is provided on the fixers 12B, 12C. A length in the Y direction of the first mounting bracket 12 is greater than a length in the Y direction of the base main body 11.

Figure 5:
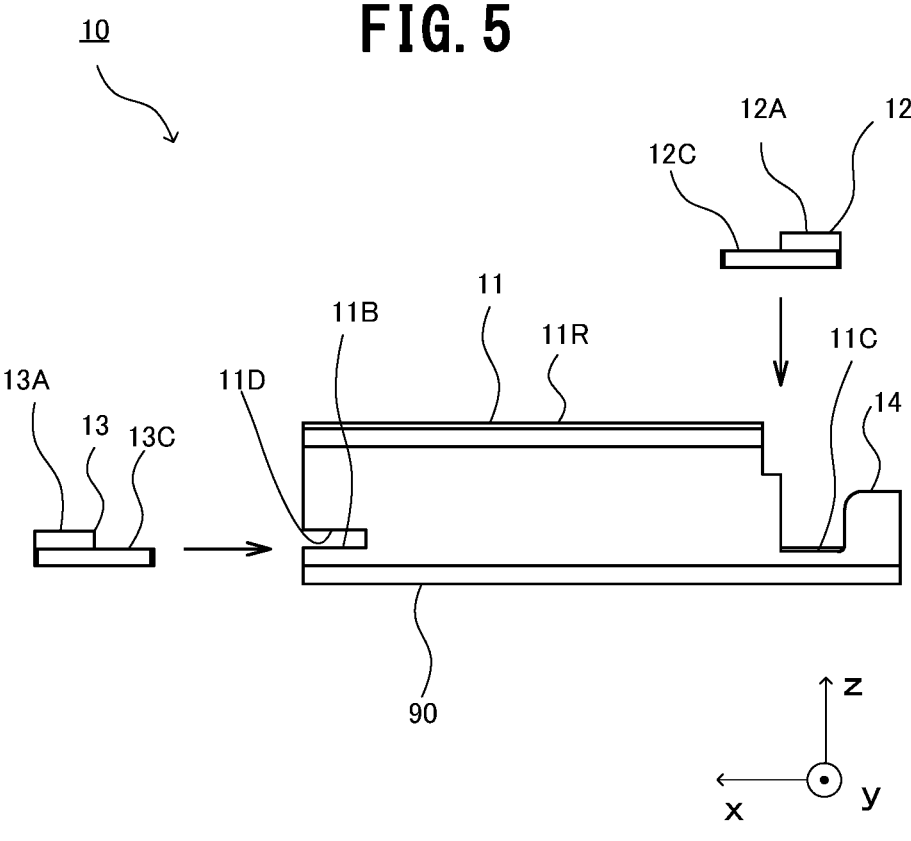
FIG. 5 is an exploded side view of the trestle base according to the embodiment.
Figure 6:
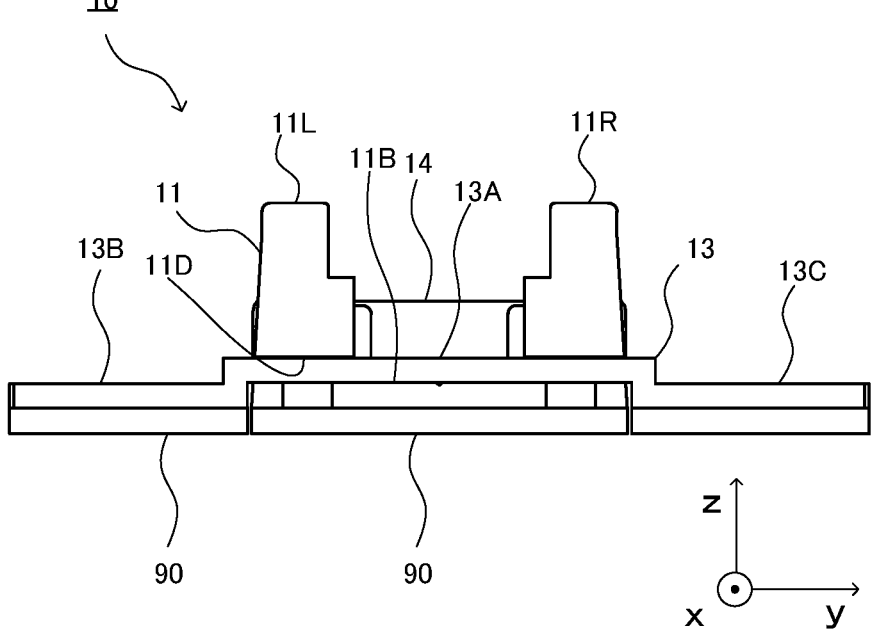
FIG. 6 is a back view of the trestle base according to the embodiment.

The second mounting bracket 13 fixes the base main body 11 to the roof surface R, and includes a hold down member 13A that holds down the bottom plate 11B, and fixers 13B, 13C that are provided on both ends and that are fixed to the roof surface R. As illustrated in FIGS. 5 and 6, the hold down member 13A is provided on an upper surface of the hold down member 13A and is disposed in a slit 11D provided between the base main body 11 and the pair of side walls 11R, 11L. A screw hole in which the base mounting fastener B2 illustrated in FIG. 3 is inserted is provided on the fixers 13B, 13C. A length in the Y direction of the second mounting bracket 13 is greater than the length in the Y direction of the base main body 11.

Note that the trestle base 10 is used with a sheet 90 made from butyl rubber, for example, affixed to the rear surface thereof. Note that the shape of the sheet 90 made from butyl rubber illustrated in FIG. 1 is an example, and the shape is not limited thereto. Additionally, the material of the sheet 90 is not limited to butyl rubber, and may be a material other than butyl rubber.

With the trestle base 10 configured in the manner described above, the base main body 11 and the wall 14 are integrally manufactured by, for example, performing casting in which at least two molds are opened in the up-down direction (the +Z direction and the −Z direction). However, the present disclosure is not limited thereto, and a manufacturing method other than casting may be used provided that the base main body 11 and the wall 14 can be integrally formed. Among the various casting methods, it is preferable that the trestle base 10 is manufactured by die casting. However, the present disclosure is not limited thereto. The trestle base 10 may be manufactured by casting other than die casting such as casting using sand molds, gypsum molds, resin molds, lost wax molds, or the like.

The slide bracket S illustrated in FIG. 1 is fitted in the grooves 15R, 15L of the trestle base 10 illustrated in FIG. 3 so as to be slidable in the first direction D1. The slide bracket S is attached to the trestle base 10 at a desired position in the first direction D1 to perform positioning of the solar panel P in the first direction D1. In one example, the slide bracket S is formed from a metal and, specifically, is formed from a metal that is the same material as the trestle base 10. A screw hole is formed on the slide bracket S. The screw hole penetrates in the Z-axis direction, the support member mounting fastener B1 screws into the screw hole, and an inner circumferential surface of the screw hole is formed into a female screw surface.

A construction method of the trestle 1 configured as described above is described while referencing the drawings.

When installing the trestle 1 and the solar panel P illustrated in FIG. 1 on the roof surface R, a worker that installs the trestle 1 on the roof surface R first mounts the trestle base 10 illustrated in FIG. 3 on the roof surface R. Specifically, firstly, the worker arranges the base main body 11 on the roof surface R, and fixes the base main body 11 to the roof surface R by the base mounting fastener B2.

Figure 7:
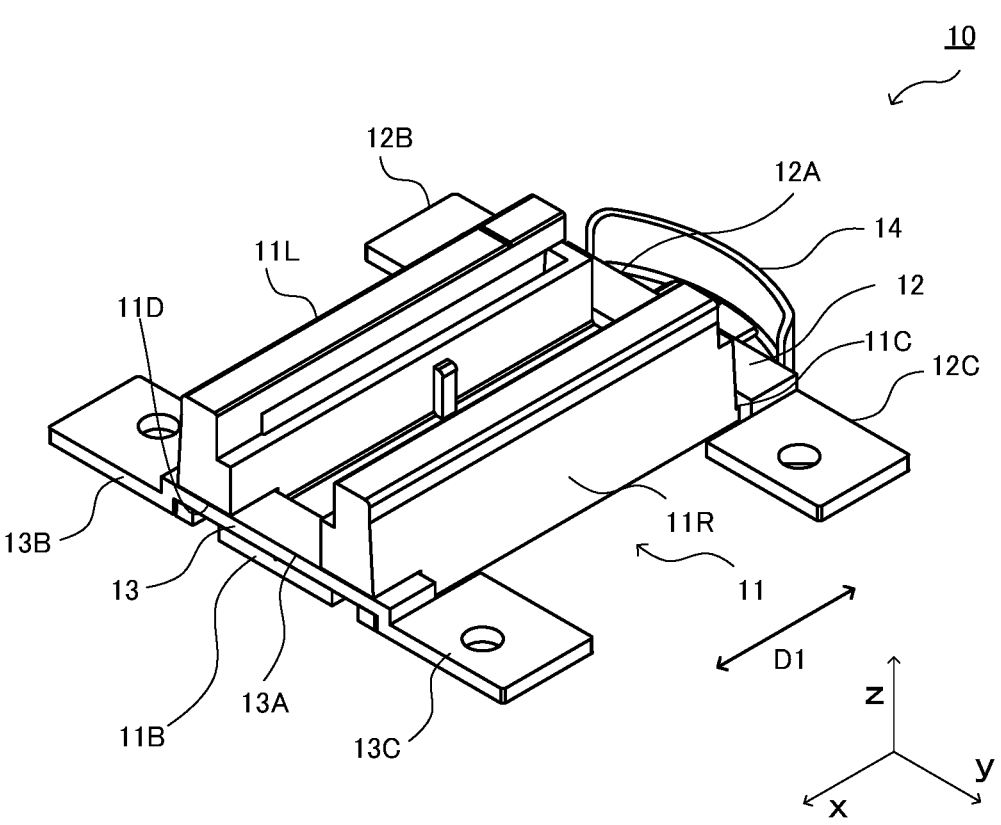
FIG. 7 is a perspective view of the trestle base according to the embodiment.

Next, as illustrated in FIGS. 5 and 6, the worker arranges the hold down member 12A of the first mounting bracket 12 on the upper surface of the bottom plate 11B, and on the wall 14, the pair of side walls 11R, 11L, and the gap 11C. Additionally, the worker arranges the hold down member 13A of the second mounting bracket 13 on the upper surface of the bottom plate 11B and in the slit 11D provided between the base main body 11 and the pair of side walls 11R, 11L. As a result, the trestle base 10 is assembled, as illustrated in FIG. 7.

Figure 8:
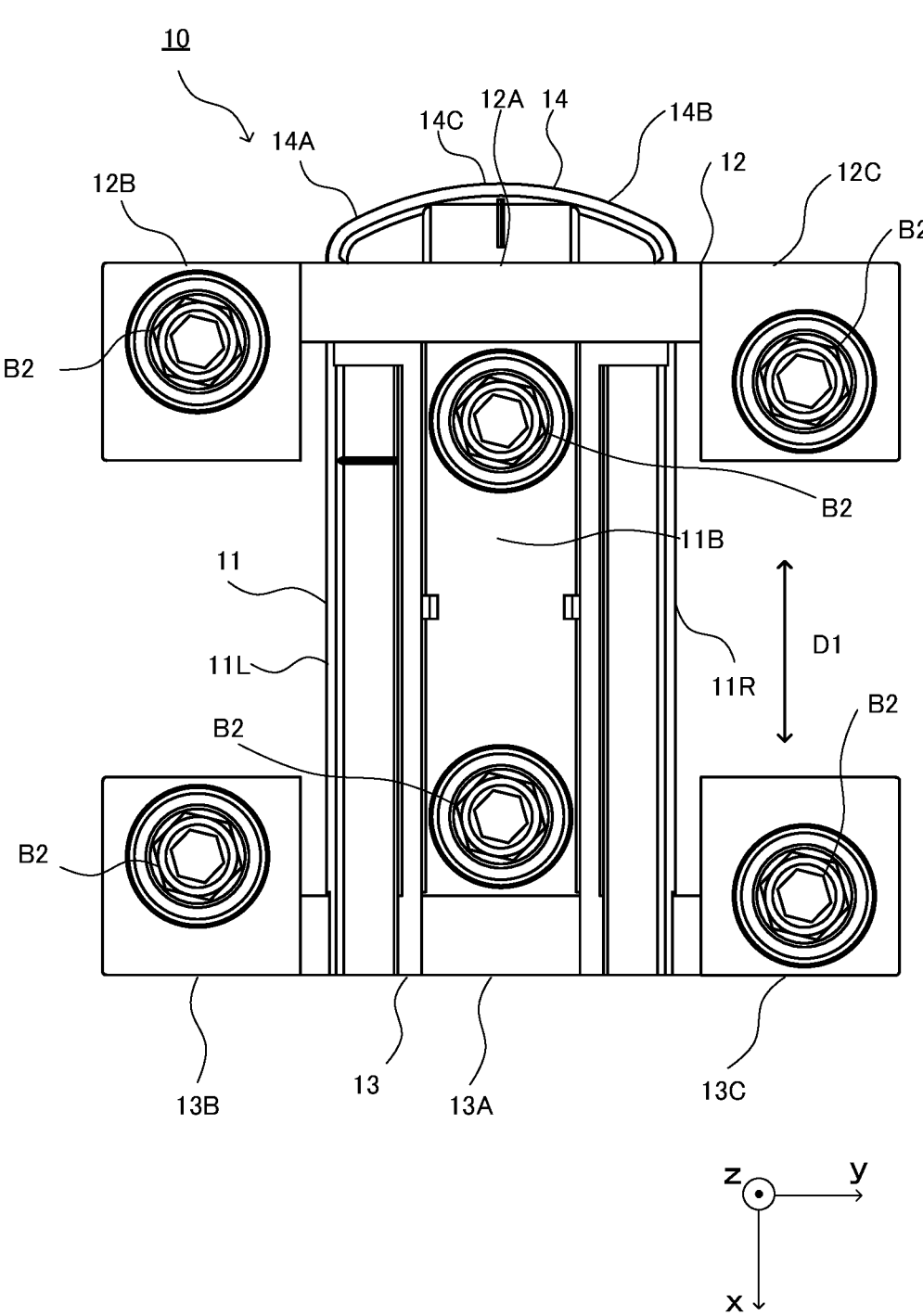
FIG. 8 is a second top view of the trestle base according to the embodiment.

Next, as illustrated in FIG. 8, the worker mounts the base mounting fastener B2 in the screw holes provided on the fixers 12B, 12C, 13B, 13C. As a result, the base main body 11, the first mounting bracket 12, and the second mounting bracket 13 are fixed to the roof surface R illustrated in FIG. 1.

Next, the worker attaches the slide bracket S and the support member 20 illustrated in FIG. 1 to the trestle base 10 in that order. The worker fixes the support member 20 to the slide bracket S by the support member mounting fastener B1 illustrated in FIG. 2.

Next, the worker temporarily fixes the receiving member 40 to the support member 20 using the first fastener 60.

Next, the worker fits the installation object disposing member 31, to which the solar panel P is not attached, to the receiving member 40 from the +Z side (the upper side).

Next, the worker adjusts a height level from the roof surface R to the upper end of the installation object disposing member 31 to a desired height level. Then, the worker fixes the receiving member 40 to the support member 20 using the first fastener 60.

Next, the worker arranges the solar panel P, the cover 37 including the spacer 37-2, and the fixing member receiving member 38 on the upper surface of the installation object disposing member 31. Then, the worker fixes, with respect to the installation object disposing member 31, the solar panel P, the cover 37, and the fixing member receiving member 38 using a plurality of the fixing member 32. At this time, the worker can adjust the positions of the plurality of the fixing member 32 to strongly fix the solar panel P.

Thus, as illustrated in FIGS. 1 and 2, the work of installing the trestle 1 and the solar panel P on the roof surface R of the building is ended.

As described above, the trestle 1 and the trestle base 10 according to the present embodiment include the first mounting bracket 12 and the second mounting bracket 13 and, as such, fixing strength can be obtained with a small fixing member. Specifically, the hold down member 12A of the first mounting bracket 12 is provided on the wall 14, the pair of side walls 11R, 11L, and the gap 11C, and is disposed on the upper surface of the bottom plate 11B. As a result, the first mounting bracket 12 is fixed to the base main body 11, and the first mounting bracket 12 can fix the base main body 11 to the roof surface R. Additionally, the hold down member 13A of the second mounting bracket 13 is provided on the upper surface of the bottom plate 11B and is disposed in the slit 11D that is provided between the base main body

11 and the pair of side walls 11R, 11L. As a result, the second mounting bracket 13 is fixed to the base main body 11, and the second mounting bracket 13 can fix the base main body 11 to the roof surface R. Accordingly, by fixing the first mounting bracket 12 and the second mounting bracket 13 to the roof surface R, the fixing strength of the base main body 11 disposed on the roof surface R can be reinforced. In contrast, in order to obtain fixing strength with only the base main body 11, the size of the base main body 11 must be increased, which leads to a larger space being needed when storing, the mass of the base main body 11 increasing due to the increased size, and increased transport costs.

The trestle base 10 according to the present embodiment is formed by die casting. As such, in the present embodiment, the manufacturing costs of the trestle base 10 can be suppressed compared to when manufacturing by extruding a metal such as aluminum or by press-molding a metal plate.

Additionally, the trestle base 10 according to the present embodiment is formed by die casting and, as such, the wall 14 can be formed at a position in the base main body 11 where it is easiest to prevent the rainwater from contacting the base mounting fastener B2. Additionally, in the present embodiment, the trestle base 10 can be formed in a shape that protrudes in the +Z direction with respect to the roof surface R.

With the trestle base 10 according to the present embodiment, the wall 14 is formed integrally with the base main body 11. As such, due to the base main body 11 and the wall 14 being formed as separate bodies, the wall 14 is easier to dispose at a desired position on the roof surface R regardless of the skill of the worker in the present embodiment than in a case in which the base main body 11 is mounted on the roof surface R and, thereafter, the wall 14 is attached to the base main body 11. As a result, in the present embodiment, the work efficiency of installing the trestle base 10 on the roof surface R of the building can be improved.

Additionally, in the present embodiment, as illustrated in FIG. 3, the slide restrictors 16R, 16L are formed on the grooves 15R, 15L formed on the respective opposing surfaces of the pair of side walls 11R, 11L. As such, the slide restrictors 16R, 16L restrict sliding, with respect to the trestle base 10, of the slide bracket S and the fixing unit 30, illustrated in FIG. 1, in the +X direction. As a result, the trestle 1 according to the present embodiment can enhance the work efficiency when carrying out installation/removal work on the roof surface R of the house.

MODIFIED EXAMPLES

Figure 9:
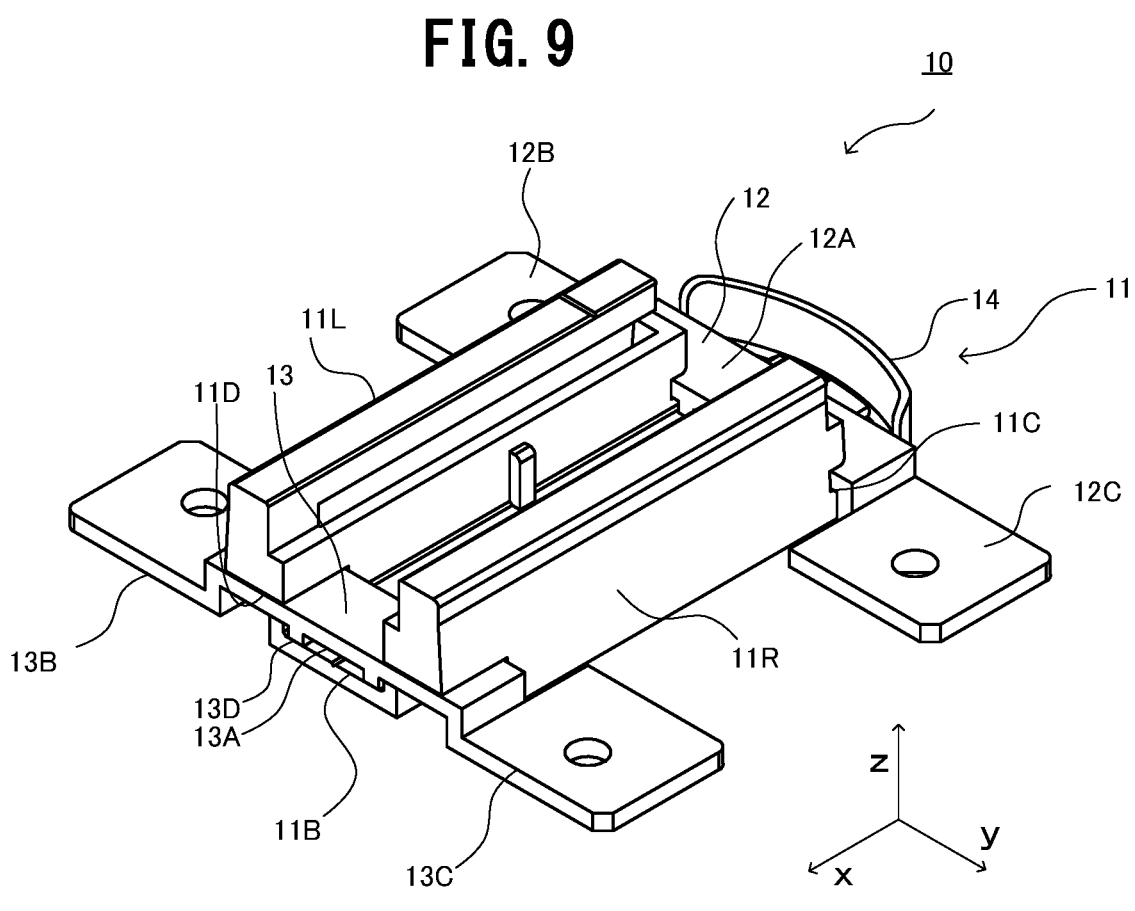
FIG. 9 is a first perspective view of a trestle base according to modified examples.
Figure 10:
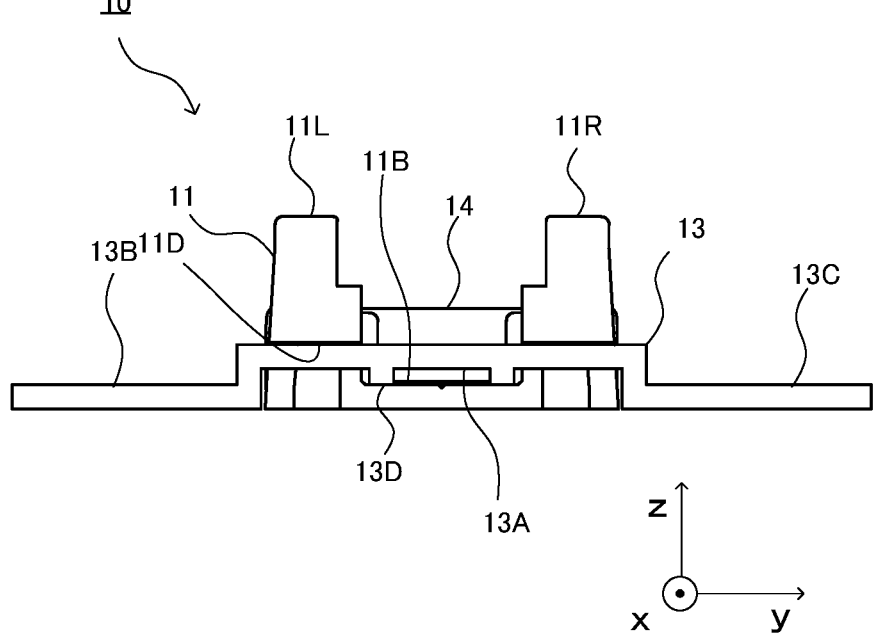
FIG. 10 is a first back view of the trestle base according to the modified examples.
Figure 11:
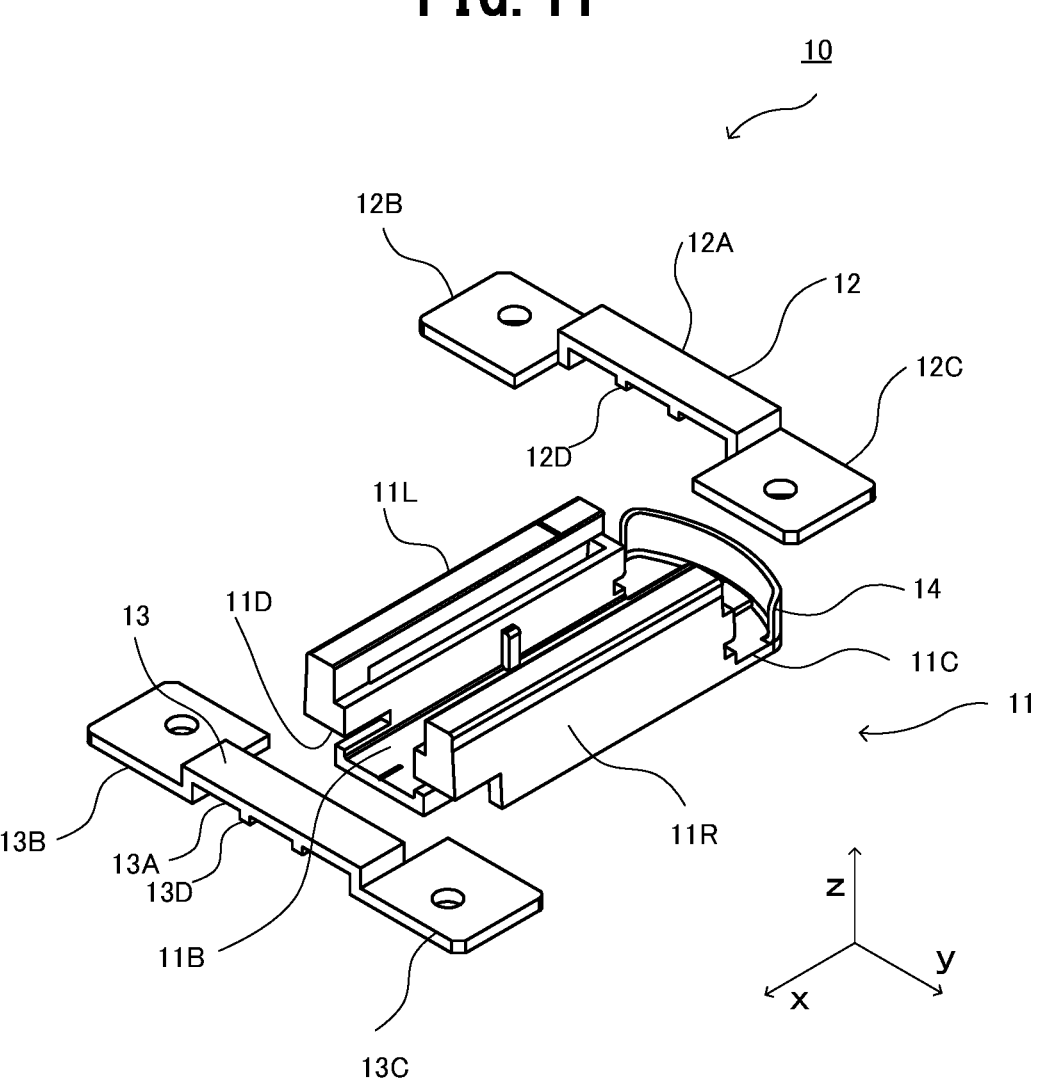
FIG. 11 is a first exploded perspective view of the trestle base according to the modified examples.

With the trestle base 10 of the embodiment described above, an example is described in which the hold down member 12A of the first mounting bracket 12 and the hold down member 13A of the second mounting bracket 13 are disposed on the upper surface of the bottom plate 11B of the base main body 11. It is sufficient that the hold down member 12A of the first mounting bracket 12 and the hold down member 13A of the second mounting bracket 13 can hold down the bottom plate 11B of the base main body 11 and, as illustrated in FIGS. 9 and 10, a configuration is possible in which a gap is provided between the bottom plate 11B and the hold down members 12A, 13A. In such a case, as illustrated in FIG. 11, the hold down members 12A, 13A respectively include protrusions 12D, 13D on surfaces opposing the bottom plate 11B. The protrusions 12D, 13D hold down the upper surface of the bottom plate 11B of the base main body 11 and, as such, can fix the base main body 11 to the roof surface R illustrated in FIG. 1. Additionally, due to the gap being provided between the bottom plate 11B and the hold down members 12A, 13A, rainwater that has accumulated on the upper surface of the bottom plate 11B of the base main body 11 drains. In this example, the hold down members 12A, 13A respectively include the protrusions 12D, 13D on the surfaces opposing the bottom plate 11B, but a configuration is possible in which protrusions are formed on the bottom plate 11B and a gap is provided between the bottom plate 11B and the hold down members 12A, 13A by another configuration.

Figures 12, 13:
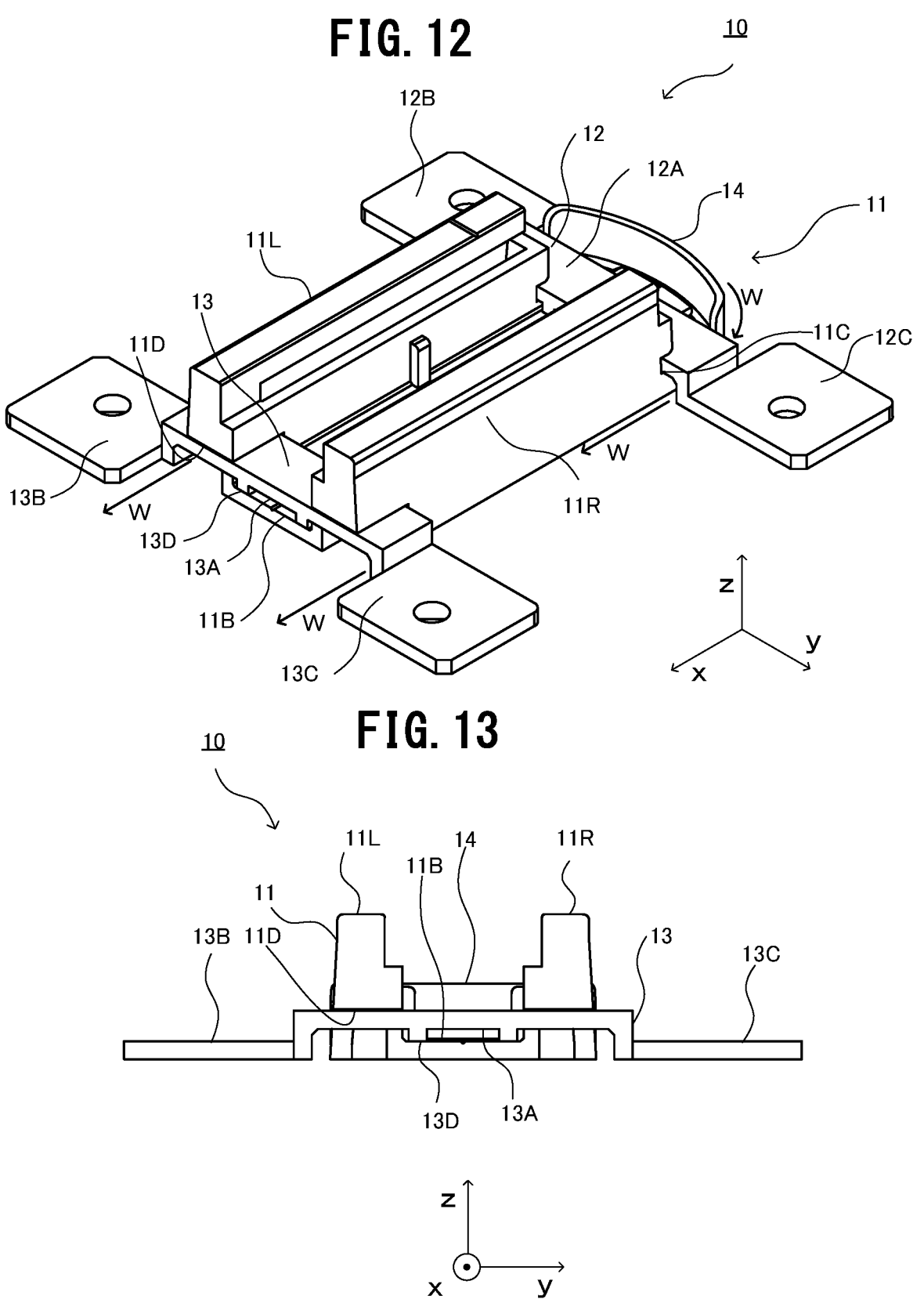
FIG. 12 is a second perspective view of the trestle base according to the modified examples.
FIG. 13 is a second back view of the trestle base according to the modified examples.
Figure 14:
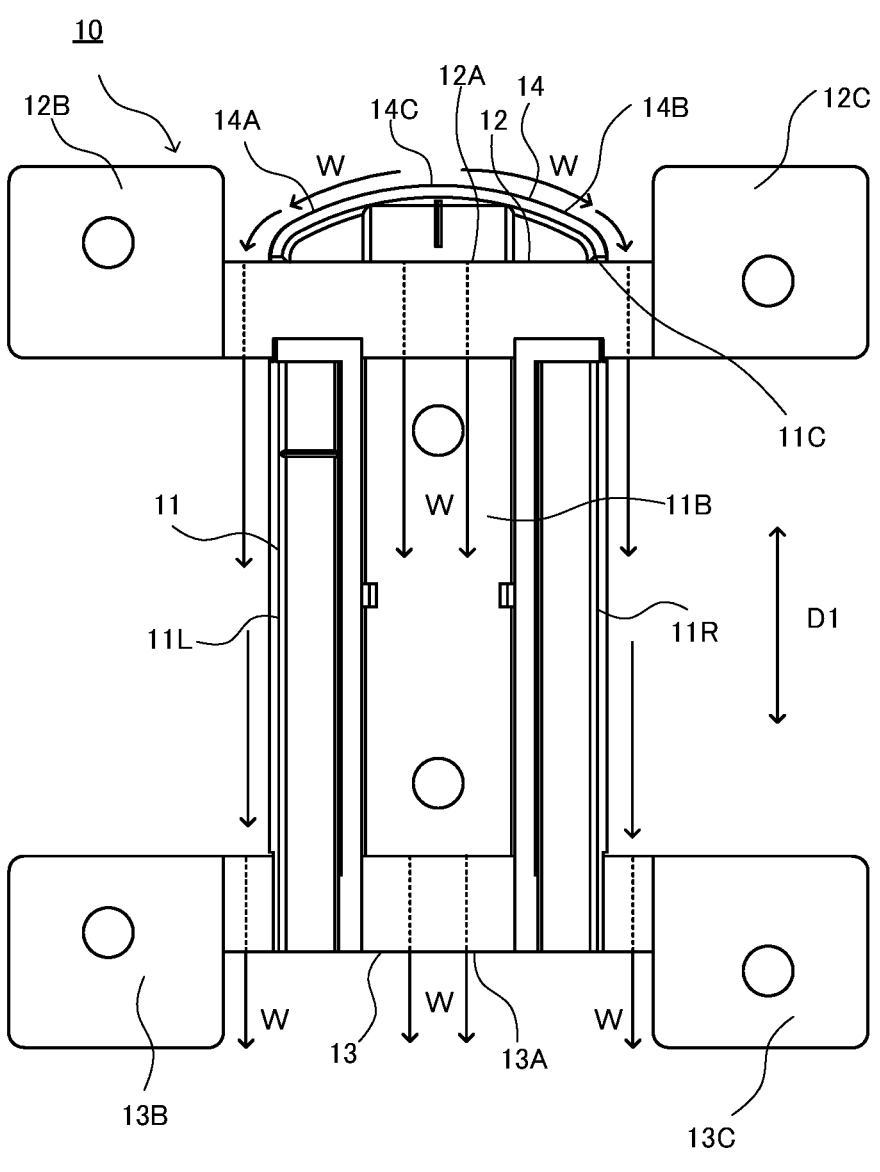
FIG. 14 is a first top view of the trestle base according to the modified examples.
Figure 14:
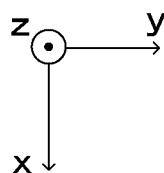
Figure 15:
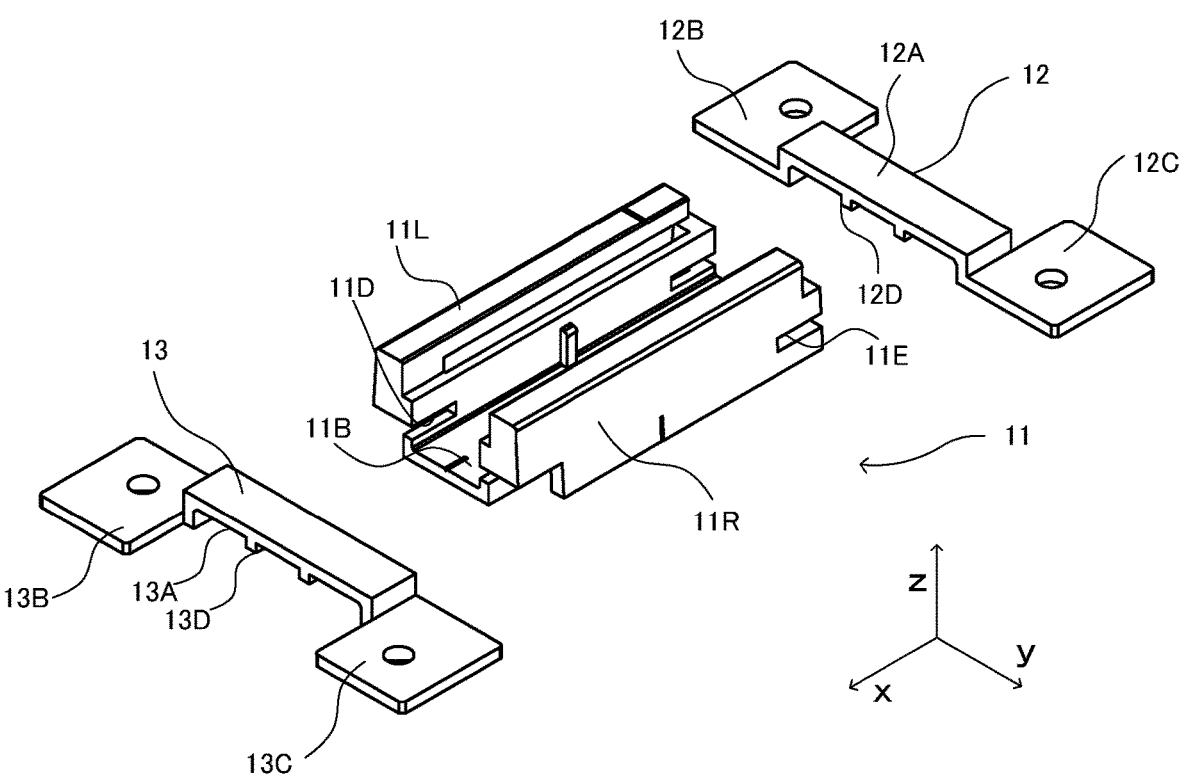
FIG. 15 is a second exploded perspective view of the trestle base according to the modified examples.
Figure 16:
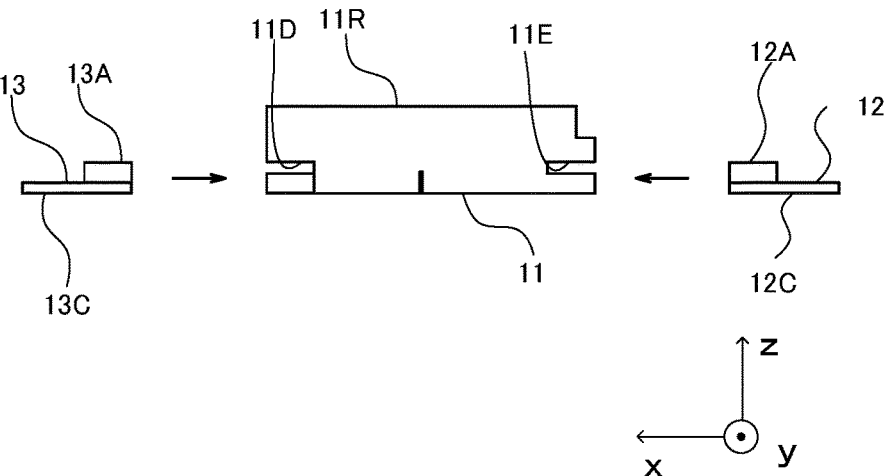
FIG. 16 is an exploded side view of the trestle base according to the modified examples.
Figure 17:
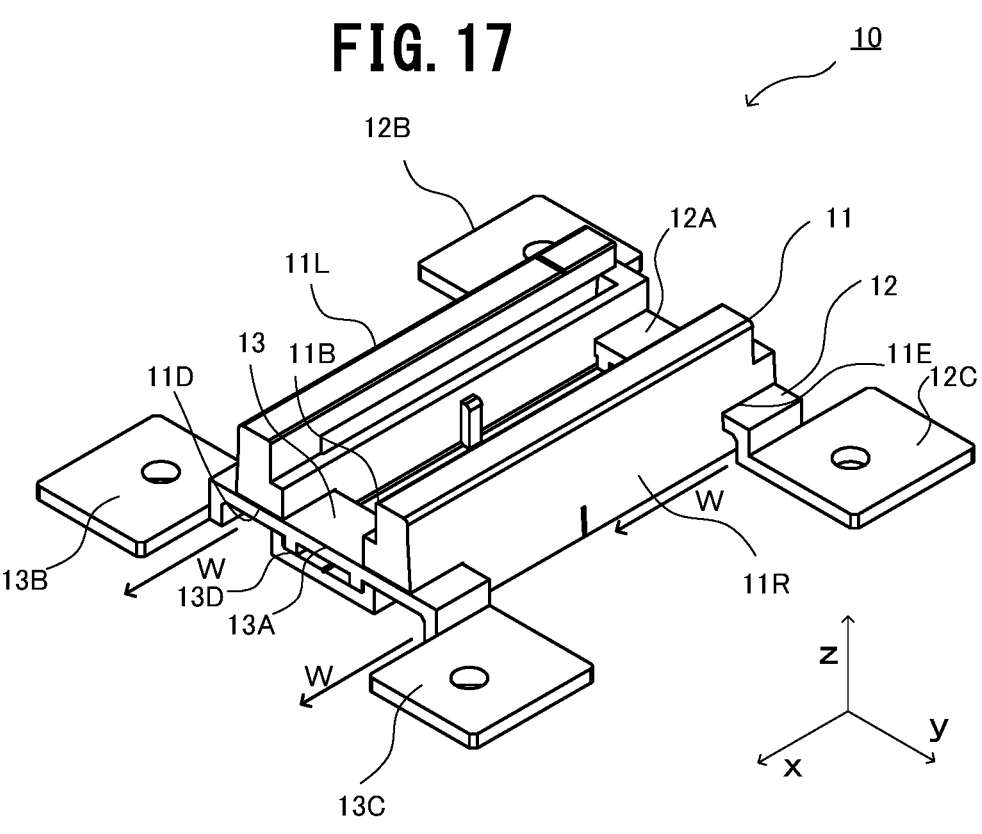
FIG. 17 is a third perspective view of the trestle base according to the modified examples.
Figure 18:
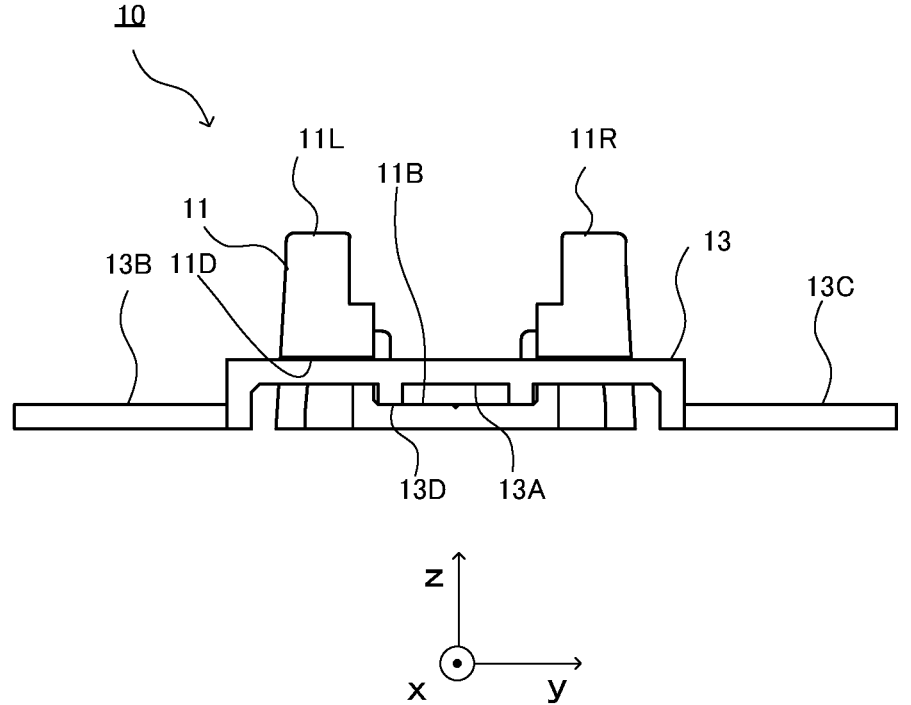
FIG. 18 is a third back view of the trestle base according to the modified examples.

As illustrated in FIGS. 12 and 13, a configuration is possible in which a gap is provided between the base main body 11 and the fixers 12B, 12C, 13B, 13C of the first mounting bracket 12 and the second mounting bracket 13. Additionally, the wall 14 is included that is provided at the end toward the ridge (toward the –X side) in the base main body 11, and that is formed protruding in the +Z direction with respect to the roof surface R of the building illustrated in FIG. 1. As illustrated in FIG. 14, the wall 14 can direct rainwater W, flowing from the ridge side, in the eave direction (the +X direction) while dividing the rainwater W to the left and right, namely, to the –Y side and the +Y side. Furthermore, the rainwater W flows and drains through the gap between the base main body 11 and the fixers 12B, 12C, 13B, and 13C of the first mounting bracket 12 and the second mounting bracket 13. By configuring in this manner, the rainwater W flowing on the roof surface R of the building can be prevented from contacting the base mounting fastener that mounts the trestle 1 on the roof surface R. Thus, when, for example, the base mounting fastener is made from wood, rotting of the base mounting fastener can be prevented from progressing. By extension, the trestle base 10 can suppress deterioration of the base mounting fastener caused by the rainwater W. As a result, the trestle base 10 can suppress decreases in the fixing force of the trestle 1 relative to the roof surface R. Note that, as illustrated in FIG. 11, when the first mounting bracket 12 and the second mounting bracket 13 respectively include the protrusions 12D, 13D on the surfaces opposing the bottom plate 11B, the protrusions 12D, 13D contact the pair of side walls 11R, 11L, and the first mounting bracket 12 and the second mounting bracket 13 can be prevented from shifting in the Y direction.

Figure 19:
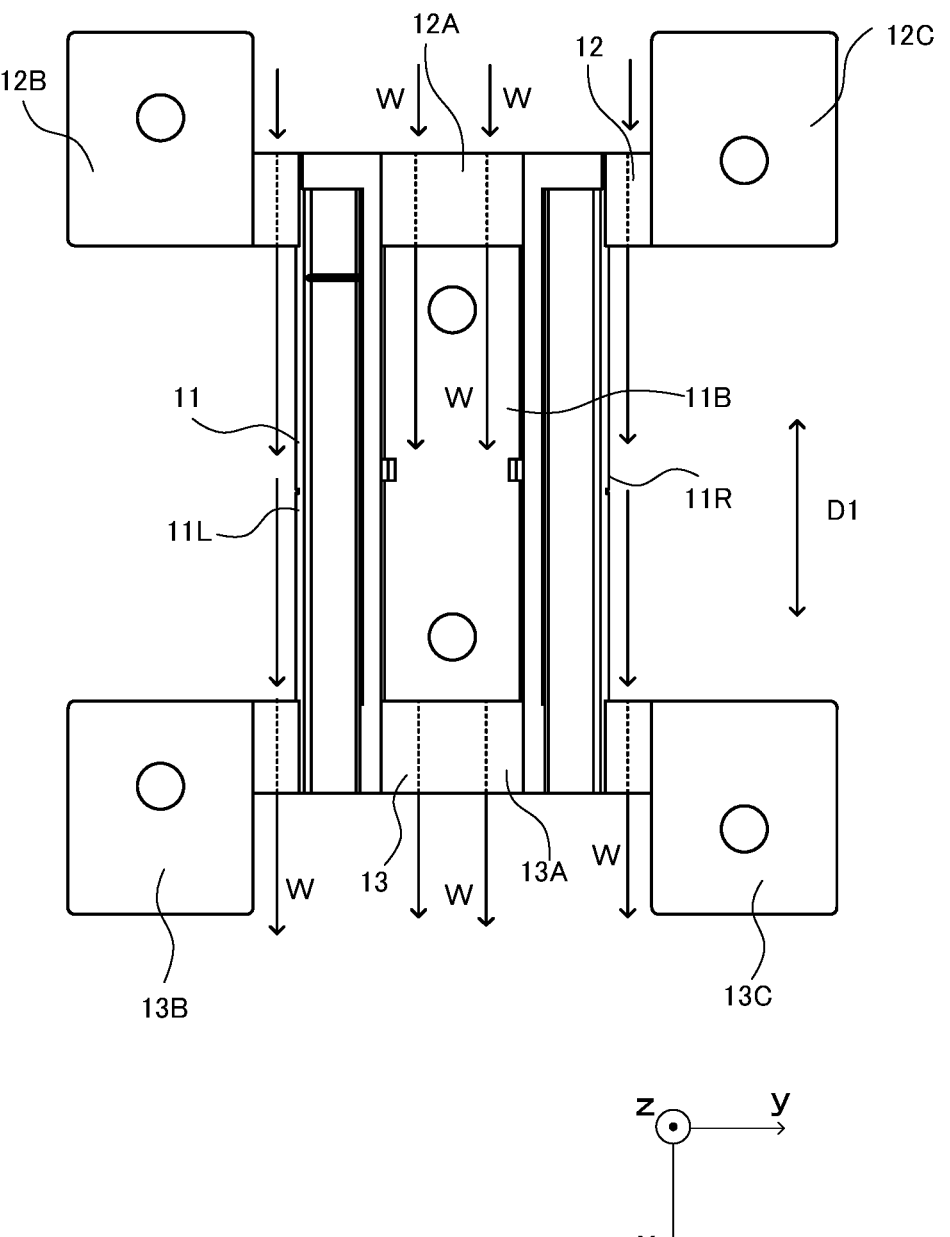
FIG. 19 is a second top view of the trestle base according to the modified examples.

In the embodiment described above, an example is described in which the first mounting bracket 12 is provided on the wall 14, the pair of side walls 11R, 11L, and the gap 11C, and is disposed on the upper surface of the bottom plate 11B. However, a configuration is possible in which the first mounting bracket 12 is attached to one end of the base main body 11. For example, as illustrated in FIGS. 15 to 18, a configuration is possible in which, like the second mounting bracket 13, the first mounting bracket 12 is disposed in a slit 11E provided between the base main body 11 and the pair of side walls 11R, 11L. In this case, the base main body 11 does not include the wall 14, but instead includes the slit 11E provided between the base main body 11 and the pair of side walls 11R, 11L. As illustrated in FIG. 19, in addition to the gap between the base main body 11 and the fixers 12B, 12C, 13B, 13C of the first mounting bracket 12 and the second mounting bracket 13, the rainwater W also flows and drains through the gap between the bottom plate 11B and the hold down members 12A, 13A. By configuring in this manner, the rainwater W flowing on the roof surface R of the building illustrated in FIG. 1 can be prevented from contacting the base mounting fastener that mounts the trestle 1 to the roof surface R. Thus, when, for example, the base mounting fastener is made from wood, rotting of the base mounting fastener can be prevented from progressing. By extension, the trestle base 10 can suppress deterioration of the base mounting fastener caused by the rainwater W. As a result, the trestle base 10 can suppress decreases in the fixing force of the trestle 1 relative to the roof surface R.

A configuration is possible in which the first mounting bracket 12 includes a square band, and is disposed covering an upper portion of the pair of side walls 11R, 11L. By configuring in this manner, the first mounting bracket 12 can fix the trestle base 10 to the roof surface R.

In the embodiment described above, an example is described in which the second mounting bracket 13 is provided on the upper surface of the hold down member 13A and is disposed in the slit 11D provided between the base main body 11 and the pair of side walls 11R, 11L. However, it is sufficient that the second mounting bracket 13 is attached to the other end of the base main body 11. For example, a configuration is possible in which the second mounting bracket 13 includes a square band, and is disposed covering the upper portion of the pair of side walls 11R, 11L. By configuring in this manner, the second mounting bracket 13 can fix the trestle base 10 to the roof surface R.

In the embodiment described above, an example is described in which the support member 20 is slidably attached to the trestle base 10. However, it is sufficient that the support member 20 is attached to the trestle base 10, and a configuration is possible in which the support member 20 is directly fixed to the trestle base 10. By configuring in this manner, the grooves 15R, 15L need not necessarily be formed on the side walls 11R, 11L, and the need for the slide bracket S is eliminated and, as such, the structure can be simplified.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

| | |
|---|---|
| 1 | Trestle |
| 10 | Trestle base |
| 11 | Base main body |
| 11B | Bottom plate |
| 11R, 11L | Side wall |
| 11C | Gap |
| 11D, 11E | Slit |
| 12 | First mounting bracket |
| 12A, 13A | Hold down member |
| 12B, 12C, 13B, 13C | Fixer |
| 12D, 13D | Protrusion |
| 13 | Second mounting bracket |
| 14 | Wall |
| 14A | First inclined surface |
| 14B | Second inclined surface |
| 14C | Protruding surface |
| 15R, 15L | Groove |
| 16R, 16L | Slide restrictor |
| 20 | Support member |
| 21 | Height direction adjusting groove (receiving member attacher) |
| 23 | Protrusion |
| 30 | Fixing unit |
| 31 | Installation object disposing member |
| 32 | Fixing member |
| 32-1, 32-2 | Side wall |
| 32-3 | Coupling plate |

-continued

| | |
|---|---|
| 32-4, 32-5 | Extension |
| 32-4a | Engaged portion |
| 37 | Cover |
| 37-1 | Cover main body |
| 37-2 | Spacer |
| 38 | Fixing member receiving member |
| 39 | Second fastener |
| 40 | Receiving member |
| 50 | Base unit |
| 60 | First fastener |
| 61 | Bolt |
| 62 | Nut |
| 90 | Sheet |
| S | Slide bracket |
| B1 | Support member mounting fastener |
| B2 | Base mounting fastener |
| D1 | First direction (the eave-ridge direction) |
| H | Height direction |
| P | Solar panel (installation object) |
| R | Roof surface |
| W | Rainwater |

The invention claimed is:

1. A trestle base for fixing an installation object to be installed on a roof surface of a building, the trestle base comprising:

a base main body to which a support member supporting the installation object is attached, and that is fixed to the roof surface;

a first mounting bracket that is attached to one end of the base main body; and a second mounting bracket that is attached to another end of the base main body, wherein the first mounting bracket and the second mounting bracket each include, on both ends, a fixer that is fixed to the roof surface, the base main body includes a bottom plate that is fixed to the roof surface, the first mounting bracket includes a hold down member that holds down the bottom plate, the second mounting bracket includes a hold down member that holds down the bottom plate, a gap is provided between the bottom plate, and the hold down member of the first mounting bracket and the hold down member of the second mounting bracket, the gap being configured to drain rainwater that has accumulated on an upper surface of the bottom plate of the base main body, the base main body includes a pair of side walls erected on the bottom plate, the base main body further includes a wall erected on one end of the bottom plate, and the first mounting bracket is provided between the pair of side walls and the wall, and disposed on the upper surface of the bottom plate.

2. The trestle base according to claim 1, wherein the first mounting bracket is fitted in a slit provided between the bottom plate and the pair of side walls.

3. The trestle base according to claim 1, wherein the second mounting bracket is fitted in a slit provided between the bottom plate and the pair of side walls.

4. The trestle base according to claim 1, wherein the second mounting bracket is fitted in a slit provided between the bottom plate and the pair of side walls.

5. The trestle base according to claim 1, wherein a gap is provided between the base main body, and the fixer provided to the first mounting bracket and the second mounting bracket.

6. A trestle, comprising:

a trestle base for fixing an installation object to be installed on a roof surface of a building;

a support member attached to the trestle base; and a fixing unit that is supported by the support member and that is for fixing the installation object to be installed on a roof surface of a building, wherein the trestle base includes a base main body to which the support member supporting the installation object is attached, and that is fixed to the roof surface, a first mounting bracket that is attached to one end of the base main body, and a second mounting bracket that is attached to another end of the base main body, the first mounting bracket and the second mounting bracket each include, on both ends, a fixer that is fixed to the roof surface, the base main body includes a bottom plate that is fixed to the roof surface, a pair of side walls erected on the bottom plate, and a wall erected on one end of the bottom plate, and the first mounting bracket is provided between the pair of side walls and the wall, and disposed on an upper surface of the bottom plate.

7. The trestle according to claim 6, wherein the first mounting bracket is fitted in a slit provided between the bottom plate and the pair of side walls.

8. The trestle according to claim 6, wherein the second mounting bracket is fitted in a slit provided between the bottom plate and the pair of side walls.

9. The trestle according to claim 6, wherein a gap is provided between the bottom plate, and the first mounting bracket and the second mounting bracket.

10. The trestle according to claim 6, wherein a gap is provided between the base main body, and the fixer provided to the first mounting bracket and the second mounting bracket.

* * * * *